US012661866B2

(12) United States Patent
Matsuta

(10) Patent No.: US 12,661,866 B2
(45) Date of Patent: Jun. 23, 2026

(54) COMPOSITE MATERIAL

(71) Applicant: A.L.M.T. Corp., Tokyo (JP)

(72) Inventor: Naoya Matsuta, Toyama (JP)

(73) Assignee: A.L.M.T. Corp., Tokyo (JP)

( * ) Notice: Subject to any disclaimer, the term of this patent is extended or adjusted under 35 U.S.C. 154(b) by 0 days.

(21) Appl. No.: 17/926,088

(22) PCT Filed: Mar. 25, 2022

(86) PCT No.: PCT/JP2022/014440
§ 371 (c)(1),
(2) Date: Nov. 17, 2022

(87) PCT Pub. No.: WO2023/281862
PCT Pub. Date: Jan. 12, 2023

(65) Prior Publication Data
US 2024/0227353 A1 Jul. 11, 2024

(30) Foreign Application Priority Data

Jul. 6, 2021 (JP) ................................. 2021-112169

(51) Int. Cl.
*B32B 15/00* (2006.01)
*B23K 20/02* (2006.01)
*B32B 15/01* (2006.01)
*B32B 15/20* (2006.01)
(52) U.S. Cl.
CPC ............ *B32B 15/01* (2013.01); *B23K 20/023* (2013.01); *B32B 15/20* (2013.01)
(58) Field of Classification Search
None
See application file for complete search history.

(56) References Cited

U.S. PATENT DOCUMENTS 3,455,663 A 7/1969 Zdanuk
5,988,488 A 11/1999 Slattery et al.

FOREIGN PATENT DOCUMENTS

| CN | 103658904 A | | 3/2014 |
| CN | 104416973 A | | 3/2015 |
| CN | 105346161 A | * | 2/2016 |
| CN | 105499833 A | | 4/2016 |
| CN | 105855745 A | | 8/2016 |

(Continued)

OTHER PUBLICATIONS

Saito et al., Machanical properties of HIP bonded W and Cu-alloys joint for plasma facing components, 2002 (Year: 2002).*

(Continued)

*Primary Examiner* — Mary I Omori
(74) *Attorney, Agent, or Firm* — McCarter & English, LLP; Michael A. Sartori

(57) ABSTRACT

A composite material includes: a first member containing tungsten as a primary component; a second member containing copper as a primary component, the second member being joined to the first member; and a metal containing at least one metal selected from a group consisting of titanium, zirconium, and hafnium, the metal being present in the second member, wherein a concentration of the metal is more than 0 atomic % and less than or equal to 5.0 atomic % at a location of 5 μm from a joining interface between the first member and the second member toward the second member side.

8 Claims, 3 Drawing Sheets

(56)                    References Cited

FOREIGN PATENT DOCUMENTS

| | | | | |
|---|---|---|---|---|
| CN | 106862693 | A | | 6/2017 |
| CN | 108746910 | A | | 11/2018 |
| CN | 112605551 | A | | 4/2021 |
| JP | S60-187494 | A | | 9/1985 |
| JP | S60-187640 | A | | 9/1985 |
| JP | 09059770 | A | * | 3/1997 |
| JP | 2018069299 | A | * | 5/2018 |
| JP | 2020-101452 | A | | 7/2020 |

OTHER PUBLICATIONS

Zou et al., Diffusion Bonding of Tungsten to Copper and Its Alloy with Ti Foil and Ti/Ni/Ti Multiple Interlayers, 2003 (Year: 2003).*

Li et al., High heat load properties of acively cooled W/CuCrZr mock-ups by diffusion bonding with Ni or Ti interlayer, Jul. 18, 2011 (Year: 2011).*

Ma et al., machine translation of CN 105346161, Feb. 24, 2016 (Year: 2016).*

Mao et al., machine translation of CN 106862693, Jun. 20, 2017 (Year: 2017).*

Office Action issued in Chinese Application No. 202280004992.8 dated May 25, 2024.

Office Action issued in Chinese Application No. 202280004992.8 dated Jan. 7, 2025. [w/English Translation].

Japanese Modern Casting Technology, edited by Hantong Lin, Shanghai Economic Zone Foundry Association, pp. 620-621, Apr. 1990. [cited in NPL1].

Extended European Search Report issued in Application No. 22817517.0 dated Apr. 7, 2025.

* cited by examiner

COMPOSITE MATERIAL

TECHNICAL FIELD

The present disclosure relates to a composite material. The present application claims a priority based on Japanese Patent Application No. 2021-112169 filed on Jul. 6, 2021, the entire contents of which are incorporated herein by reference.

BACKGROUND ART

Conventionally, a tungsten-copper-based composite material is disclosed, for example, in Japanese Patent Laying-Open No. 60-187494 (PTL 1), Japanese Patent Laying-Open No. 60-187640 (PTL 2) and Japanese Patent Laying-Open No. 2020-101452 (PTL 3).

CITATION LIST

Patent Literature

PTL 1: Japanese Patent Laying-Open No. 60-187494
PTL 2: Japanese Patent Laying-Open No. 60-187640
PTL 3: Japanese Patent Laying-Open No. 2020-101452

SUMMARY OF INVENTION

Technical Problem

A composite material according to the present disclosure includes: a first member containing tungsten as a primary component; a second member containing copper as a primary component, the second member being joined to the first member; and a metal containing at least one selected from a group consisting of titanium, zirconium, and hafnium, the metal being present in the second member, wherein a concentration of the metal is more than 0 atomic % and less than or equal to 5.0 atomic % at a location of 5 μm from a joining interface between the first member and the second member toward the second member side.

DESCRIPTION OF EMBODIMENTS

Problem to be Solved by the Present Disclosure

In a tungsten-copper-based composite material, a joining portion has a low heat resistance, disadvantageously.

DESCRIPTION OF EMBODIMENTS OF THE PRESENT DISCLOSURE

Figure 1:
FIG. 1 is a cross sectional view of a composite material 1 according to an embodiment.
Figure 1:
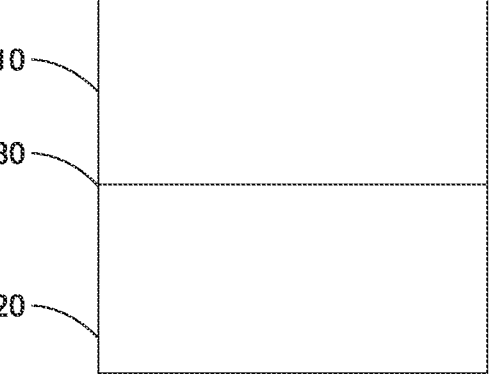

First, embodiments of the present disclosure are listed and described. The following describes the embodiments of the present disclosure with reference to figures.
FIG. 1 is a cross sectional view of a composite material 1 according to an embodiment. Composite material 1 includes: a first member 10 containing tungsten as a primary component; a second member 20 containing copper as a primary component, second member 20 being joined to first member 20; and a metal (insert metal) containing at least one selected from a group consisting of titanium, zirconium, and hafnium, the metal being present in second member 20, wherein a concentration of the metal is more than 0 atomic % and less than or equal to 5.0 atomic % at a location of 5 μm from a joining interface 30 between first member 10 and second member 20 toward the second member side. The primary component refers to a component having the maximum ratio in mass ratio.

Tungsten has the highest melting point among all the metals, has high heat resistance, and has a high radiation shielding property. On the other hand, in view of heat conductivity, a copper-based metal has the highest heat conductivity among practical metals, and is widely used as a heat radiation material. A composite structure including such a copper-based metal serving as a cooling member and tungsten having the high heat resistance has been reviewed as a structure in which both the features of the copper-based metal and tungsten are exhibited to attain both heat resistance performance and cooling performance.

Conventionally, the composite structure including tungsten and the copper-based metal has been produced by brazing tungsten to the copper-based metal. However, the joining by brazing has a problem with heat resistance in view of such a principle that the metal having a melting point lower than that of the base material is melted and solidified. It is considered to use a nickel-based brazing material having a relatively high melting point; however, nickel is harmful to human body and is restricted in handling. In view of these problems, the following methods have been reviewed: a method of joining tungsten to a copper-based metal by a method such as discharge plasma sintering or the like; and a method of producing a composite structure, wherein a copper-based metal melted in tungsten is directly casted so as not to form a low-melting point layer. However, these methods have the following problems: in the former method, there is a restriction in shape; and in the latter method, the copper-based metal is limited to pure copper.

In the present disclosure, a composite structure having sufficient heat resistance has been realized by introducing an appropriate insert metal into a copper-based metal and controlling an interface structure while utilizing a metallurgical reaction between respective members.

In the composite structure having a joining state according to the present disclosure, the melting point of a joining portion is higher than that in the composite structure according to the conventional art, thus resulting in improved heat resistance of the composite structure.

Composite material 1 is a tungsten-copper-based alloy composite material, in which the concentration of an insert metal component is more than 0 atomic % and less than or equal to 5.0 atomic % at a location of 5 μm from a joining interface 30 just below first member 10 serving as a tungsten member toward the second member 20 side. When the concentration of the insert metal is more than 5.0 atomic %, the melting point of the joining portion is decreased to result in decreased heat resistance of the composite material.

A method of measuring the concentration of the insert metal component is as follows.

Joining interface 30 in a cross section of the tungsten-copper-based alloy composite material is observed with an electron beam microanalyzer (JXA-8200 manufactured by JEOL) so as to perform a wavelength dispersive X-ray analysis. First, joining interface 30 in the tungsten-copperbased alloy composite material is defined as a location at which the total of the constituent elements of the tungsten-containing layer represented by first member 10 and the total of the constituent elements of the copper-based alloy represented by second member 20 are equal to each other in a line analysis performed between two points, i.e., from a point of the tungsten-containing layer to a point of the copper-based alloy. A spot analysis is performed in accordance with the procedure of ISO 22489:2016 at a location of 5 μm from joining interface 30 toward the copper-based alloy side. The spectrum of a characteristic X-ray when irradiated with an electron beam having an acceleration voltage of 15 kV, a beam current of 50 nA, and a spot diameter of 10 μm is divided to calculate the constituent ratio of each element using a ZAF method, thereby calculating the concentration of the insert metal component in atomic %.

The concentration of the insert metal component is more preferably equal to or more than 0.1 atomic % at the location of 5 μm from joining interface 30 just below first member 10 toward the second member 20 side, first member 10 serving as the tungsten member of the tungsten-copper-based alloy composite material.

When the concentration is more than or equal to 0.1 atomic %, the strength of the joining interface becomes higher. It should be noted that in view of avoiding formation of a brittle intermetallic compound and in view of heat resistance, the concentration of less than 0.1 atomic % is preferable.

The concentration of the insert metal component is more preferably equal to or less than 1.0 atomic % at the location of 5 μm from joining interface 30 just below first member 10 toward the second member 20 side, first member 10 serving as the tungsten member of the tungsten-copper-based alloy composite material.

When the concentration is less than or equal to 1.0 atomic %, higher heat resistance can be obtained at the joining portion. Further, since a certain amount of the insert metal component is dissolved in the copper-based alloy in a solid state while avoiding formation of a brittle intermetallic compound, strength is increased in the region just below the joining interface of the copper-based alloy, with the result that the strength of the tungsten-copper-based alloy composite material may be improved.

The insert metal of the tungsten-copper-based alloy composite material is composed of one or more elements selected from titanium, zirconium, and hafnium. In each of these metals, a liquid phase is emerged by reaction with the copper-based metal, and each of these metals is wetted and spread widely at the interface, thereby contributing to the joining. Further, each of these metals is preferable due to the following reason: each of these metals has a strong affinity for oxygen and is expected to provide a getter effect by which an oxide, which may serve an obstacle for the joining, is effectively removed from each of the outermost surfaces of both the members.

For the insert metal of the tungsten-copper-based alloy composite material, titanium is the most preferable. Since titanium has a high degree of solubility to a copper-based metal, a brittle intermetallic compound is less likely to be formed, thereby increasing mechanical reliability of the composite material.

Examples of a method of introducing the insert metal serving as an intermediate layer include insertion of a foil, plating, vapor deposition, sputtering, and the like.

For the tungsten-copper-based alloy composite material, the thickness of the insert metal introduced at the time of joining is preferably less than or equal to 50 μm. When the thickness is more than 50 μm, a brittle intermetallic compound layer might be formed on the copper-based metal side just below the interface after the joining to result in decreased mechanical reliability of the tungsten-copper-based alloy composite material, and the concentration of the insert metal remaining on the copper-based metal side just below the interface after joining might become more than 5.0 atomic % to result in decreased heat resistance of the tungsten-copper-based alloy composite material. It should be noted that the expression "might" indicates that an event occurs with a slight possibility, and does not mean that the event occurs with a high probability. In this range, the formation of the brittle intermetallic compound layer can be avoided.

For the tungsten-copper-based alloy composite material, the thickness of the insert metal introduced at the time of joining is most preferably less than or equal to 25 μm. This range is the most preferable due to the following reason: the concentration of the insert metal remaining on the copper-based metal side just below the interface after the joining is less than or equal to 1.0 atomic %, thereby attaining sufficient heat resistance.

For the tungsten-copper-based alloy composite material, the thickness of the insert metal introduced at the time of joining is preferably more than or equal to 5 μm. When the thickness is less than 5 μm, the insert metal component may not be diffused to the whole of the joining surface and therefore the joining may become incomplete, thus resulting in decreased strength.

The thickness, shape, width, and length of first member 10, which is the tungsten-containing layer of the tungsten-copper-based alloy composite material, can be freely selected depending on a purpose of use. Normally, the shape of the joining surface is preferably flat in view of adjustment of the joining surface.

The composition of first member 10, which is a tungsten-containing layer of the tungsten-copper-based alloy composite material, can be freely selected depending on a purpose of use. For a purpose of use that requires heat resistance, the content ratio of tungsten of the tungsten-containing layer is more than or equal to 70 mass %, and is preferably more than or equal to 90 mass %. Further, a member constituted of a tungsten-containing layer having a single composition or a member constituted of a combination of tungsten-containing layers having a plurality of compositions can be used. Further, first member 10 may be a functionally graded material in which the function of the material is changed depending on a location.

The thickness, shape, width, and length of second member 20, which is the copper-based alloy of the tungsten-copper-based alloy composite material, can be freely selected depending on a purpose of use. Normally, the shape of the joining surface is preferably flat in view of adjustment of the joining surface.

The composition of the copper-based alloy of second member 20 of the tungsten-copper-based alloy composite material can be appropriately determined depending on a purpose of use. The term "copper-based alloy" in the present invention refers to an alloy containing copper as a primary component, such as: a pure copper (tough pitch copper, oxygen-free copper, or phosphorus deoxidized copper); a precipitation-strengthened copper alloy (beryllium copper, chromium copper, or chromium zirconium copper); or an dispersion-strengthened copper alloy (alumina-dispersed copper or the like). For a purpose of use that requires heat resistance, a copper alloy having a melting point of more than or equal to 1000° C. is preferable. Further, a member composed of a single copper alloy or a member composed of a combination of a plurality of copper alloys can be also used.

In particular, when joining the tungsten-containing layer to the copper-based alloy having high strength, a three-layer structure in which a pure-copper-based layer having low strength is interposed therebetween is preferable because it is expected to exhibit an effect of reducing residual stress after the joining. As the copper-based alloy for second member 20 in the tungsten-copper-based alloy composite material, a member composed of a combination of a plurality of copper alloys can be also used. In particular, a three-layer structure in which the tungsten-containing layer, the pure-copper-based layer, and the copper-based metal layer having a strength higher than that of the pure-copper-based layer are layered in this order is preferable because it is expected to exhibit the effect of reducing the residual stress after the joining, which would have otherwise caused a problem in joining the copper-based alloy having a high strength to the tungsten-containing layer. The thickness of the pure-copper-based layer is preferably more than or equal to 0.2 mm. When the thickness is less than 0.2 mm, a sufficient stress buffering effect may not be obtained. The thickness of the pure-copper-based layer is preferably less than 1.5 mm. When the thickness is more than or equal to 1.5 mm, the ratio of the pure-copper-based layer having a low strength is increased, with the result that the strength of the whole of the composite material may be decreased. The thickness of the pure-copper-based layer is more preferably more than or equal to 0.5 mm and less than or equal to 1.0 mm. When the thickness is in this range, balance can be attained between the sufficient stress buffering effect and the strength of the whole of the composite material.

Examples of the pure-copper-based layer include oxygen-free copper, tough pitch copper, and phosphorus deoxidized copper.

Details of Embodiments of the Present Disclosure

Hereinafter, the present invention will be described based on examples.

(1) Sample Preparation

As shown in Tables 1 to 5, samples of sample No. 1 to No. 7 each serving as a comparative example and samples of sample No. 11 to No. 36 each serving as an example of the present disclosure were prepared.

TABLE 1

| Sample No. | Tungsten-Containing Layer | | | Copper-Based Alloy | | | Insert Metal | | Joining Structure (Tungsten-Containing Layer/Insert Metal/ Copper-Based Alloy) |
| | Composition | Shape | Size (mm) | Composition | Shape | Size (mm) | Composition | Thickness (μm) | |
|---|---|---|---|---|---|---|---|---|---|
| 1 | Pure W | Round Bar | φ20 × L50 | Chromium Zirconium Copper C18150 | Round Bar | φ20 × L50 | None | | Pure W/Chromium Zirconium Copper |
| 2 | | | φ20 × L50 | | | φ20 × L50 | Copper Manganese Brazing Material (Cu-33 atomic % Mn) | 50 | Pure W/Copper Manganese Brazing Material/Chromium Zirconium Copper |
| 3 | | | φ20 × L50 | | | φ20 × L50 | Pure Ti | 100 | Pure W/Pure Ti/Chromium Zirconium Copper |
| 4 | | | φ20 × L50 | | | φ20 × L50 | Copper Manganese Brazing Material (Cu-33 atomic % Mn) | 50 | Pure W/Copper Manganese Brazing Material/Chromium Zirconium Copper |
| 5 | | | φ20 × L50 | | | φ20 × L50 | Pure T | 25 | Pure W/Pure Ti/Chromium Zirconium Copper |
| 6 | | | φ20 × L50 | | | φ20 × L50 | Pure Ti | 55 | Pure W/Pure Ti/Chromium Zirconium Copper |
| 7 | | | φ20 × L50 | | | φ20 × L50 | Pure Ti | 25 | Pure W/Pure Ti/Chromium Zirconium Copper |

TABLE 2

| Sample No. | Tungsten-Containing Layer | | | Copper-Based Alloy | | | Insert Metal | | Joining Structure (Tungsten-Containing Layer/Insert Metal/ Copper-Based Alloy) |
| | Composition | Shape | Size (mm) | Composition | Shape | Size (mm) | Composition | Thickness (μm) | |
|---|---|---|---|---|---|---|---|---|---|
| 11 | Pure W | Round Bar | φ20 × L50 | Chromium Zirconium Copper C18150 | Round Bar | φ20 × L50 | Pure Ti | 25 | Pure W/Pure Ti/Chromium Zirconium Copper |
| 12 | Pure W | | φ20 × L50 | Alumina-Dispersed Copper | | φ20 × L50 | Pure Ti | 25 | Pure W/Pure Ti/Alumina-Dispersed Copper |

TABLE 2-continued

| Sample No. | Tungsten-Containing Layer | | | Copper-Based Alloy | | | Insert Metal | | Joining Structure (Tungsten-Containing Layer/Insert Metal/Copper-Based Alloy) |
|---|---|---|---|---|---|---|---|---|---|
| | Composition | Shape | Size (mm) | Composition | Shape | Size (mm) | Composition | Thickness (μm) | |
| 13 | Pure W | | φ20 × L50 | Oxygen-Free Copper C1020 | | φ20 × L50 | Pure Ti | 25 | Pure W/Pure Ti/Oxygen-Free Copper |
| 14 | Pure W | | φ20 × L50 | Oxygen-Free Copper C1020 | | φ20 × L50 | Pure Ti | 10 | Pure W/Pure Ti/Oxygen-Free Copper |
| 15 | W-26 mass % Re | | φ30 × L30 | Alumina-Dispersed Copper | | φ30 × L30 | Pure Ti | 10 | W-26 mass % Re Alloy/Pure Ti/Alumina-Dispersed Copper |
| 16 | W-10 mass % (Fe, Ni) | | φ30 × L30 | Oxygen-Free Copper C1020 | | φ30 × L30 | Pure Ti | 10 | W-10 mass % (Fe, Ni)/Pure Ti/Oxygen-Free Copper |
| 17 | Pure W | | φ30 × L30 | Alumina-Dispersed Copper | | φ30 × L30 | Pure Ti | 50 | Pure W/Pure Ti/Alumina-Dispersed Copper |
| 18 | W-3 mass % Re | | φ30 × L30 | Oxygen-Free Copper C1020 | | φ30 × L30 | Pure Ti | 20 | W-3 mass % Re Alloy/Pure Ti/Oxygen-Free Copper |
| 19 | W-10 mass % Cu | Flat Plate | T1 × B20 × L80 | Chromium Zirconium Copper C18150 | Flat Plate | T15 × B20 × L80 | Pure Ti | 10 | W-10 mass % Cu/Pure Ti/Chromium Zirconium Copper |

TABLE 3

| Sample No. | Tungsten-Containing Layer | | | Copper-Based Alloy | | | Insert Metal | | Joining Structure (Tungsten-Containing Layer/Insert Metal/Copper-Based Alloy) |
|---|---|---|---|---|---|---|---|---|---|
| | Composition | Shape | Size (mm) | Composition | Shape | Size (mm) | Composition | Thickness (μm) | |
| 20 | W-20 mass % Cu | Flat Plate | T1 × B20 × L80 | Chromium Zirconium Copper C18150 | Flat Plate | T1 × B20 × L80 | Pure Ti | 10 | W-20 mass % Cu/Pure Ti/Chromium Zirconium Copper |
| 21 | Pure W | Flat Plate | T5 × B20 × L80 | Oxygen-Free Copper C1020 | Flat Plate | T15 × B20 × L80 | Pure Ti | 5 | Pure W/Pure Ti/Oxygen-Free Copper |
| 22 | Pure W | Round Bar | φ20 × L50 | Chromium Zirconium Copper C18150 | Round Bar | φ20 × L50 | Pure Ti | 25 | Pure W/Pure Ti/Chromium Zirconium Copper |
| 23 | Pure W | Round Bar | φ20 × L50 | Chromium Zirconium Copper C18150 | Round Bar | φ20 × L50 | Pure Ti | 20 | Pure W/Pure Ti/Chromium Zirconium Copper |
| 24 | Pure W | Flat Plate | T5 × B30 × L120 | Oxygen-Free Copper C1020 | Flat Plate | T15 × B20 × L80 | Pure Ti | 10 | Pure W/Pure Ti/Oxygen-Free Copper |
| 25 | Pure W | Round Bar | φ20 × L50 | Chromium Zirconium Copper C18150 | Round Bar | φ20 × L50 | Pure Ti | 25 | Pure W/Pure Ti/Chromium Zirconium Copper |
| 26 | Pure W | Round Bar | φ20 × L50 | Chromium Zirconium Copper C18150 | Round Bar | φ20 × L50 | Pure Ti | 25 | Pure W/Pure Ti/Chromium Zirconium Copper |

TABLE 4

| Sample No. | Tungsten-Containing Layer | | | Copper-Based Alloy | | | Insert Metal | | Joining Structure (Tungsten-Containing Layer/Insert Metal/Copper-Based Alloy) |
| | Composition | Shape | Size (mm) | Composition | Shape | Size (mm) | Composition | Thickness (μm) | |
|---|---|---|---|---|---|---|---|---|---|
| 27 | Pure W | Round Bar | φ20 × L50 | Oxygen-Free Copper C1020 | Round Bar | φ20 × L50 | Pure Hf | 20 | Pure W/Pure Hf/Oxygen-Free Copper |
| 28 | Pure W | Round Bar | φ20 × L50 | Oxygen-Free Copper C1020 | Round Bar | φ20 × L50 | Pure Zr | 20 | Pure W/Pure Zr/Oxygen-Free Copper |
| 29 | Pure W | Round Bar | φ20 × L50 | Oxygen-Free Copper C1020 | Round Bar | φ20 × L50 | Ti-50 mass % Zr | 25 | Pure W/Ti-50 mass % Zr/Chromium Zirconium Copper |
| 30 | Pure W | Round Bar | φ20 × L50 | Oxygen-Free Copper/ Chromium Zirconium Copper C1020 · C18150 | Round Bar | φ20 × L (0.5 mm Oxygen-Free Copper −49.5 mm Chromium Zirconium Copper) | Pure Ti | 25 | Pure W/Pure Ti/ Oxygen-Free Copper-Chromium Zirconium Copper |
| 31 | Pure W | Flat Plate With Round Hole | φ20 × T10 | Oxygen-Free Copper C1020 | Round Bar | φ20 × L10 | Pure Ti | 25 | Pure W/Pure Ti/ Oxygen-Free Copper |

TABLE 5

| Sample No. | Tungsten-Containing Layer | | | Copper-Based Alloy | | | Insert Metal | | Joining Structure (Tungsten-Containing Layer/Insert Metal/Copper-Based Alloy) |
| | Composition | Shape | Size (mm) | Composition | Shape | Size (mm) | Composition | Thickness (μm) | |
|---|---|---|---|---|---|---|---|---|---|
| 32 | Pure W | Round Bar | φ20 × L50 | Oxygen-Free Copper/ Chromium Zirconium Copper C1020 · C18150 | Round Bar | φ20 × L (1.4 mm Oxygen-Free Copper- 48.6 mm Chromium Zirconium Copper) | Pure Ti | 25 | Pure W/Pure Ti/ Oxygen-Free Copper- Chromium Zirconium Copper |
| 33 | Pure W | Round Bar | φ20 × L50 | Oxygen-Free Copper/ Chromium Zirconium Copper C1020 · C18150 | Round Bar | φ20 × L (0.2 mm Oxygen-Free Copper- 49.8 mm Chromium Zirconium Copper) | Pure Ti | 25 | Pure W/Pure Ti/ Oxygen-Free Copper- Chromium Zirconium Copper |
| 34 | Pure W | Round Bar | φ20 × L50 | Oxygen-Free Copper/ Chromium Zirconium Copper C1020 · C18150 | Round Bar | φ20 × L (1.0 mm Oxygen-Free Copper- 49.0 mm Chromium Zirconium Copper) | Pure Ti | 25 | Pure W/Pure Ti/ Oxygen-Free Copper- Chromium Zirconium Copper |
| 35 | Pure W | Round Bar | φ20 × L50 | Oxygen-Free Copper/ Chromium Zirconium Copper C1020 · C18150 | Round Bar | φ20 × L (0.1 mm Oxygen-Free Copper- 49.9 mm Chromium Zirconium Copper) | Pure Ti | 25 | Pure W/Pure Ti/ Oxygen-Free Copper- Chromium Zirconium Copper |
| 36 | Pure W | Round Bar | φ20 × L50 | Oxygen-Free Copper/ Alumina- Dispersed Copper C1020 | Round Bar | φ20 × L (1.5 mm Oxygen-Free Copper- 48.5 mm Alumina- Dispersed Copper) | Pure Ti | 25 | Pure W/Pure Ti/ Oxygen-Free Copper- Alumina- Dispersed Copper |

C18150 in Tables 1 to 5 represents an alloy number of copper in the UNS standard. C1020 represents an alloy number of copper in JIS H3100 (2012).

(1-1) Samples No. 11 to No. 31 (Examples 1 to 21 of the Present Disclosure): Production of Tungsten-Copper-Based Alloy Composites (1-1-1) Step of Preparing Materials to be Joined As a source material for the tungsten-containing layer, a round-rod-shaped tungsten stretched material having a relative density of more than or equal to 99.5% in density measurement by the Archimedes method, a thickness of 50 mm, and an outer diameter of 20 mm was prepared.

The end surface of the tungsten stretched material to serve as the joining surface was polished to be flat.

As the copper-based alloy to serve as a substrate, a round-rod-shaped chromium zirconium copper having a thickness of 50 mm and an outer diameter of 20 mm was prepared. The end surface of the chromium zirconium copper round bar to serve as the joining surface was polished to be flat.

As the insert metal, a pure titanium foil having a thickness of 25 μm and a purity of more than or equal to 99.6 mass % was used.

The above three members were layered in the order of the tungsten stretched material, the pure titanium foil, and the chromium zirconium copper round bar from above, and the end surfaces of these layered materials were then pressed by a jig including a plate, a bolt, and a nut, which are each composed of a C/C composite, thereby fixing these layered materials.

Apart from the fixing by the bolt or nut composed of a C/C composite, the materials to be joined can be fixed by fitting of both the members or by fixing with a spring.

Thereafter, a joining step is performed to obtain the below-described tungsten-copper-based alloy composite material.

(1-1-2) Joining Step

The fixed materials to be joined was heated in an atmosphere-controlled furnace and was accordingly joined together. In an argon atmosphere, heating was performed to 950° C. at a temperature increase rate of 20° C. per minute and holding was performed for 300 minutes. By the joining step, a tungsten-copper-based alloy composite material with 20 mm in diameter×100 mm in length was obtained. From the obtained composite material, one sample was cut out for cross sectional observation to have a size of 1 mm in thickness×10 mm in width×10 mm in length (tungsten portion of 5 mm; copper-based alloy portion of 5 mm), and one sample was cut out for heat resistance evaluation to have a size of 1 mm in thickness×10 mm in width×6 mm in length (tungsten portion of 1 mm; copper-based alloy portion of 5 mm) as illustrated below. As a sample for a shear test, one sample was cut out to have a size of 1 mm in thickness×10 mm in width×6 mm in length (tungsten portion of 1 mm; copper-based alloy portion of 5 mm).

Apart from the argon atmosphere, the atmosphere during the heating in the joining step is preferably a vacuum atmosphere, a reducing atmosphere such as a hydrogen atmosphere, or an inert atmosphere such as nitrogen. Heating in atmospheric air is inappropriate because the heating in atmospheric air causes oxidation of tungsten, insert metal, and copper-based alloy, which makes it difficult to attain the joining.

The heating temperature is preferably more than or equal to 920° C. When the temperature is less than 920° C., reaction between the insert metal and the copper-based alloy might become insufficient, with the result that the joining at the interface might not occur.

The heating temperature is preferably less than or equal to 1050° C. When the temperature is more than 1050° C., the copper-based alloy might be melted, with the result that the joining might be unable to be attained.

The holding time is preferably more than or equal to 180 minutes. When the holding time is less than 180 minutes, diffusion of the insert metal component might become insufficient to facilitate generation of a brittle intermetallic compound at the joining interface, and the concentration of the insert metal remaining on the copper-based metal side just below the joining interface after the joining might become more than 5.0 atomic % to result in decreased heat resistance of the tungsten-copper-based alloy composite material.

(1-1-3) Evaluation on Cross Section

The obtained sample was cut, a cross section thereof was formed into a mirror surface through rough polishing with water-resistant paper #500 and buff polishing with a diamond suspension, and then the cross section was observed using an electron beam microanalyzer (JXA-8200 manufactured by JEOL). A fine structure of the cross section was observed by a reflected electron image, and exhibited a state in which first member 10 serving as the tungsten-containing layer and second member 20 composed of the copper-based alloy are directly joined to each other, and the insert metal serving as the third layer was not observed at the joining interface. Analysis of the insert metal component just below the joining interface was performed through a wavelength dispersive X-ray analysis. The interface in the tungsten-copper-based alloy composite material was defined as a location at which the total of the constituent elements of the tungsten-containing layer and the total of the constituent elements of the copper-based alloy were equal to each other in a line analysis performed between two points, i.e., from a point of the tungsten-containing layer to a point of the copper-based alloy. A spot analysis was performed in accordance with the procedure of ISO 22489:2016 at a location of 5 μm from the interface toward the copper-based alloy side. The spectrum of a characteristic X-ray when irradiated with an electron beam having an acceleration voltage of 15 kV, a beam current of 50 nA, and a spot diameter of 10 μm was divided. The constituent ratio of each element was calculated using the ZAF method, thereby calculating the concentration of the insert metal component in atomic %. From the above evaluation, a base material component was detected in which the insert metal component is 0.51 atomic % and the remainder was Cu, Cr, and Zr. In view of this, it was confirmed that the insert metal component was thinly distributed.

Also in each of examples 2 to 26 of the present disclosure (sample No. 12 to No. 36), a joining structure was prepared by variously changing the composition, shape, and size of the tungsten-containing layer of first member 10, variously changing the composition, shape, and size of the copper-based alloy of second member 20, and variously changing the composition and thickness of the insert metal.

(1-2) Samples No. 1 to No. 7 (Comparative Examples 1 to 7): Production of Tungsten-Copper-Based Alloy Composites As sample No. 1 (comparative example 1), an attempt was made to produce a tungsten-copper-based alloy joined product in the same manner as in example 1 of the present disclosure without interposing the insert metal. The tungsten round bar and chromium zirconium copper were stacked on each other and fixed with a jig composed of a C/C composite. Thereafter, heating was performed to 950° C. in an argon atmosphere and holding was performed for 300 minutes, but joining of both the members did not occur.

As sample No. 2 (comparative example 2), a tungsten-copper-based alloy joined product was produced by brazing, and a cross section evaluation was performed using an electron beam microanalyzer in the same manner. As a source material for the tungsten-containing layer, a round-rod-shaped tungsten stretched material was used which had a relative density of more than or equal to 99.5% in density measurement by the Archimedes method, a thickness of 50 mm, and an outer diameter of 20 mm. As the copper alloy, a round-rod-shaped chromium zirconium copper having a thickness of 50 mm and an outer diameter of 20 mm was used. For selection of the brazing material, a brazing material having a high liquid phase emergence temperature is selected in view of heat resistance for the joining, and brazing is performed at a temperature sufficiently higher than the liquid phase emergence temperature. However, at the same time, in order to protect the base material, the melting point of the base material and the temperature at the time of brazing should be avoided from being close to each other. Comparative example 2 was produced by brazing with a commercially available copper manganese brazing material (Cu-33 atomic % Mn; liquid phase emergence temperature of 880° C.).

The tungsten stretched material and the surface of the chromium zirconium copper round bar were polished with water-resistant papers #180, #800, and then the tungsten stretched material, the copper manganese brazing material, and the chromium zirconium copper round bar were layered in this order. In the joining step, heating was performed in vacuum under a load of 1 kgf from above with the materials being layered, and holding was performed for 150 minutes at 960° C. sufficiently higher than the liquid phase emergence temperature of the brazing material, and then the furnace was cooled.

The joined sample was cut, a cross section thereof was then formed into a mirror surface through rough polishing with water-resistant paper #500 and buff polishing with a diamond suspension, and then the same evaluation as in example 1 of the present disclosure was performed (electron beam microanalyzer (JXA-8200, manufactured by JEOL). As a result, a brazing-material-solidified layer was observed between the tungsten-containing layer and the copper-based alloy. In an analysis on the insert metal component at a location of 5 μm from the joining interface toward the copper alloy side, a base material component was detected in which Mn was 10.1 atomic % and the remainder was Cu, Cr, and Zr.

As sample No. 3 (comparative example 3), a tungsten-copper-based alloy joined product was produced by using a titanium foil having a thickness of 100 μm as the insert metal in the same manner as in example 1 of the present disclosure. A tungsten round bar and chromium zirconium copper were stacked on each other and were fixed with a jig composed of a C/C composite. Thereafter, heating was performed to 920° C. in an argon atmosphere and holding was performed for 170 minutes, thereby attaining the joining. The joined sample was subjected to cross sectional observation in the same manner as in example 1 of the present disclosure, and 10.2 atomic % of titanium was detected in an analysis on the insert metal component at a location of 5 μm from the joining interface toward the copper alloy side.

In view of the above, it was confirmed that in each of the examples of the present disclosure, as compared with the comparative examples, the tungsten-containing layer and the copper-based metal were continuously joined to each other, i.e., a quasi-direct joining was attained.

Also in each of comparative examples 4 to 7 (sample No. 4 to No. 7), a joining structure was prepared by variously changing the composition, shape, and size of the tungsten-containing layer of first member 10, variously changing the composition, shape, and size of the copper-based alloy of second member 20, and variously changing the composition and thickness of the insert metal.

It should be noted that sample No. 4 (comparative example 4) is an example in which the holding time was changed in the joining by brazing in the conventional art. Each of samples No. 5 to 7 (comparative examples 5 to 7) and sample No. 12 to 29 (examples 2 to 19 of the present disclosure) is an example which employed the same joining method as in example 1 of the present disclosure and in which the composition and shape of the tungsten-containing layer, the thickness and composition of the insert metal, the composition and shape of the copper-based alloy, the joining temperature, and the holding time were changed.

Sample No. 30 (example 20 of the present disclosure) is an example which employed the same joining method as in example 1 of the present disclosure and in which a structure of tungsten/titanium/oxygen-free copper-chromium zirconium copper was produced by introducing and joining a pure titanium foil also between oxygen-free copper and chromium zirconium copper each having a thickness of 0.5 mm. It should be noted that in the case of this structure, the joining between the oxygen-free copper and the chromium zirconium copper may be performed by another method such as brazing or pressure bonding. Each of samples No. 32 to 36 is an example produced by the same method with the thickness of the oxygen-free copper being changed.

Sample No. 31 (example 21 of the present disclosure) is an example which employed the same joining method as in example 1 of the present disclosure and in which an oxygen-free copper round bar was joined to an inner surface of a round hole provided in the tungsten-containing layer.

Details of these joining structures are shown in Tables 1 to 5.

(2) Evaluation on Joining Strength at Room Temperature

Figure 2:
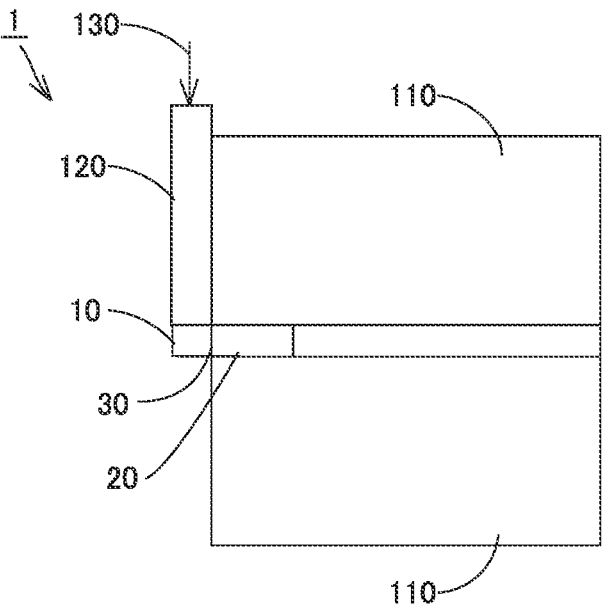
FIG. 2 is a diagram showing a shear test of composite material 1 in FIG. 1.

The joining strength of each sample was evaluated by a shear strength test. FIG. 2 is a diagram showing a shear test of composite material 1 in FIG. 1. A test piece was cut out to be 1 mm in thickness×10 mm in width×10 mm in length (tungsten portion of 1 mm; copper-based alloy portion of 9 mm). The test piece was set to protrude from jig 110 by the thickness of the tungsten-containing layer (first member 10) on the surface thereof, an indenter 120 was placed on the tungsten-containing layer, and a universal tester (Model 5985 manufactured by Instron) was used to apply a load to the test piece in a compression direction (direction indicated by an arrow 130) until the test piece is fractured. A shear strength was defined as a value obtained by dividing a load when the test piece was fractured by the cross sectional area of the test piece. It was confirmed that the sample prepared in example 1 of the present disclosure had a shear strength of 181 MPa, and the fracture of the test piece occurred at a location in the tungsten-containing layer, and the joining strength was more than or equal to the strength of tungsten of the base material. The samples of sample No. 2 and No. 3 (comparative examples 2 and 3) were also evaluated in the same manner, with the result that they were fractured at the joining interfaces just below tungsten at 130 MPa and 131 MPa, respectively. The results of samples No. 1 to No. 7 and No. 11 to No. 36 (comparative examples 1 to 7 and examples 1 to 26 of the present disclosure) are shown in Tables 6 to 10.

TABLE 6

| Sample No. | Joining Temperature (° C.) | Holding Time (Min.) | Joined/ Not Joined | Insert Metal Concentration (atomic %) | Heat Resistance Evaluation (At 1020° C.) | Shear Test (After Joining) (Shearing Stress · Manner of Fracture) | Shear Test (After Heat Resistance Evaluation) (Shearing Stress · Manner of Fracture) |
|---|---|---|---|---|---|---|---|
| 1 | 950 | 300 | Not Joined | | Unable to Be Performed | — | Unable to Be Performed |
| 2 | 960 | 150 | Joined | 10.1 | Melted and Structure Unable to be Maintained | 130 MPa · Fractured at Joining Interface | Unable to Be Performed |
| 3 | 920 | 170 | Joined | 10.2 | Melted and Structure Unable to be Maintained | 131 MPa · Fractured at Joining Interface | Unable to Be Performed |
| 4 | 960 | 360 | Joined | 5.3 | Melted and Structure Unable to be Maintained | 113 MPa · Fractured at Joining Interface | Unable to Be Performed |
| 5 | 900 | 300 | Not Joined | | Unable to Be Performed | Unable to Be Performed | Unable to Be Performed |
| 6 | 950 | 240 | Joined | 5.9 | Melted and Structure Unable to be Maintained | 131 MPa · Fractured at Joining Interface | Unable to Be Performed |
| 7 | 960 | 170 | Joined | 5.8 | Melted and Structure Unable to be Maintained | 131 MPa · Fractured at Joining Interface | Unable to Be Performed |

TABLE 7

| Sample No. | Joining Temperature (° C.) | Holding Time (Min.) | Joined/ Not Joined | Insert Metal Concentration (atomic %) | Heat Resistance Evaluation (At 1020° C.) | Shear Test (After Joining) (Shearing Stress · Manner of Fracture) | Shear Test (After Heat Resistance Evaluation) (Shearing Stress · Manner of Fracture) |
|---|---|---|---|---|---|---|---|
| 11 | 950 | 300 | Joined | 0.51 | Not Melted and Structure Maintained | 181 MPa · Base Material Fractured in Tungsten-Containing Layer | 183 MPa · Base Material Fractured in Tungsten-Containing Layer |
| 12 | 950 | 300 | Joined | 0.49 | Not Melted and Structure Maintained | 178 MPa · Base Material Fractured in Tungsten-Containing Layer | Not Performed |
| 13 | 950 | 300 | Joined | 0.55 | Not Melted and Structure Maintained | 189 MPa · Base Material Fractured in Tungsten-Containing Layer | Not Performed |
| 14 | 950 | 300 | Joined | 0.43 | Not Melted and Structure Maintained | 188 MPa · Base Material Fractured in Tungsten-Containing Layer | Not Performed |
| 15 | 950 | 300 | Joined | 0.58 | Not Melted and Structure Maintained | 220 MPa · Base Material Fractured in Tungsten-Containing Layer | Not Performed |
| 16 | 950 | 300 | Joined | 0.39 | Not Melted and Structure Maintained | 239 MPa · Base Material Fractured in Tungsten-Containing Layer | Not Performed |
| 17 | 950 | 250 | Joined | 4.9 | Not Melted and Structure Maintained | 146 MPa · Base Material Fractured in Tungsten-Containing Layer | 148 MPa · Base Material Fractured in Tungsten-Containing Layer |
| 18 | 1000 | 300 | Joined | 0.48 | Not Melted and Structure Maintained | 198 MPa · Base Material Fractured in Tungsten-Containing Layer | Not Performed |
| 19 | 950 | 300 | Joined | 0.49 | Not Melted and Structure Maintained | 198 MPa · Base Material Fractured in Tungsten-Containing Layer | Not Performed |

TABLE 8

| Sample No. | Joining Temperature (° C.) | Holding Time (Min.) | Joined/ Not Joined | Insert Metal Concentration (atomic %) | Heat Resistance Evaluation (At 1020° C.) | Shear Test (After Joining) (Shearing Stress · Manner of Fracture) | Shear Test (After Heat Resistance Evaluation) (Shearing Stress · Manner of Fracture) |
|---|---|---|---|---|---|---|---|
| 20 | 950 | 300 | Joined | 0.44 | Not Melted and Structure Maintained | 191 MPa · Base Material Fractured in Tungsten-Containing Layer | Not Performed |
| 21 | 950 | 300 | Joined | 0.22 | Not Melted and Structure Maintained | 171 MPa · Base Material Fractured in Tungsten-Containing Layer | Not Performed |
| 22 | 950 | 240 | Joined | 0.97 | Not Melted and Structure Maintained | 155 MPa ·Base Material Fractured in Tungsten-Containing Layer | Not Performed |
| 23 | 950 | 180 | Joined | 4.7 | Not Melted and Structure Maintained | 148 MPa · Base Material Fractured in Tungsten-Containing Layer/ Partially Fractured at Joining Interface | Not Performed |
| 24 | 950 | 360 | Joined | 0.12 | Not Melted and Structure Maintained | 173 MPa · Base Material Fractured in Tungsten-Containing Layer | 171 MPa Base Material Fractured in Tungsten-Containing Layer |
| 25 | 920 | 300 | Joined | 0.82 | Not Melted and Structure Maintained | 180 MPa · Base Material Fractured in Tungsten-Containing Layer | Not Performed |
| 26 | 1050 | 240 | Joined | 0.21 | Not Melted and Structure Maintained | 171 MPa · Base Material Fractured in Tungsten-Containing Layer | Not Performed |

TABLE 9

| Sample No. | Joining Temperature (° C.) | Holding Time (Min.) | Joined/ Not Joined | Insert Metal Concentration (atomic %) | Heat Resistance Evaluation (At 1020° C.) | Shear Test (After Joining) (Shearing Stress · Manner of Fracture) | Shear Test (After Heat Resistance Evaluation) (Shearing Stress · Manner of Fracture) |
|---|---|---|---|---|---|---|---|
| 27 | 1000 | 240 | Joined | 1.80 | Not Melted and Structure Maintained | 181 MPa Base Material Fractured in Tungsten-Containing Layer | Not Performed |
| 28 | 1000 | 240 | Joined | 1.78 | Not Melted and Structure Maintained | 180 MPa Base Material Fractured in Tungsten-Containing Layer | Not Performed |
| 29 | 980 | 300 | Joined | 1.1 | Not Melted and Structure Maintained | 191 MPa Base Material Fractured in Tungsten-Containing Layer | Not Performed |
| 30 | 950 | 300 | Joined | 0.53 | Not Melted and Structure Maintained | 198 MPa Base Material Fractured in Tungsten-Containing Layer | Not Performed |
| 31 | 950 | 300 | Joined | 0.54 | Not Melted and Structure Maintained | 181 MPa Base Material Fractured in Tungsten-Containing Layer | Not Performed |

TABLE 10

| Sample No. | Joining Temperature (° C.) | Holding Time (Min.) | Joined/ Not Joined | Insert Metal Concentration (atomic %) | Heat Resistance Evaluation (At 1020° C.) | Shear Test (After Joining) (Shearing Stress · Manner of Fracture) | Shear Test (After Heat Resistance Evaluation) (Shearing Stress · Manner of Fracture) |
|---|---|---|---|---|---|---|---|
| 32 | 950 | 300 | Joined | 0.54 | Not Melted and Structure Maintained | 197 MPa Base Material Fractured in Tungsten-Containing Layer | Not Performed |
| 33 | 950 | 300 | Joined | 0.53 | Not Melted and Structure Maintained | 194 MPa Base Material Fractured in Tungsten-Containing Layer | Not Performed |
| 34 | 950 | 300 | Joined | 0.52 | Not Melted and Structure Maintained | 198 MPa Base Material Fractured in Tungsten-Containing Layer | Not Performed |
| 35 | 950 | 300 | Joined | 0.54 | Not Melted and Structure Maintained | 184 MPa Base Material Fractured in Tungsten-Containing Layer | Not Performed |
| 36 | 950 | 300 | Joined | 0.53 | Not Melted and Structure Maintained | 192 MPa Base Material Fractured in Tungsten-Containing Layer | Not Performed |

(3) Evaluation on Heat Resistance

Figure 3:
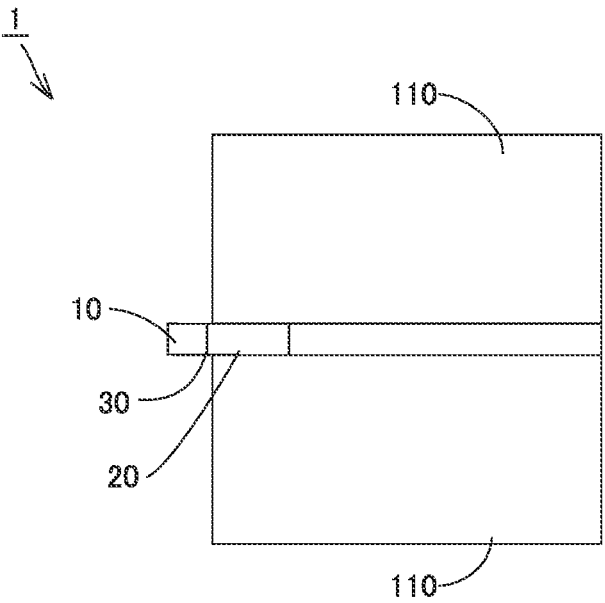
FIG. 3 is a diagram showing a heat resistance test of composite material 1 in FIG. 1.

In the present disclosure, the heat resistance was evaluated based on whether or not re-melting occurred at a temperature of more than or equal to 1289 K, which is 95% of the melting point (1357 K) of copper of the base material in the absolute temperature. FIG. 3 is a diagram showing a heat resistance test for composite material 1 in FIG. 1. Composite material 1 serving as a test piece cut out to have a size of 1 mm in thickness×2 mm in width×10 mm in length (tungsten portion of 5 mm; copper-based alloy portion of 5 mm) for the sake of heat resistance evaluation was fixed to jig 110 and heated at 1020° C. (1293 K) in a vacuum furnace. Whether or not re-melting occurred was confirmed by comparing an image of the test piece captured by a microscope before the heat treatment with an image of the test piece after the heat treatment, and whether or not the liquid phase leaked, melting and falling at the joining interface, or the like was confirmed by comparison. It was confirmed that the test piece of sample No. 11 (example 1 of the present disclosure) was not melted at 1020° C. and was maintained to have its original shape. The sample of sample No. 2 (comparative example 2) was evaluated in the same manner, and as a result, re-melting occurred at the joining interface and a desired structure was not obtained.

In view of the above results, it was confirmed that joining with heat resistance was attained in each of the examples of the present disclosure as compared with the comparative examples.

The sample of sample No. 3 (comparative example 3) was evaluated in the same manner, and as a result, re-melting occurred at the joining interface and a desired structure was not obtained.

The sample of sample No. 11 (example 1 of the present disclosure) in which the joining structure was maintained was subjected to a joining strength test after the heat resistance evaluation as described below.

(4) Evaluation on Joining Strength after Evaluation on Heat Resistance

For example 1 of the present disclosure (sample No. 11), the sample after the evaluation on heat resistance was subjected to a shear test in the same manner as in "(2) Evaluation on Joining Strength at Room Temperature". As a result of the test, the base material was fractured in the tungsten-containing layer at 183 MPa. In view of this, it was confirmed that the joining strength was hardly changed even after being exposed to the high temperature.

Evaluation results of the examples of the present disclosure and comparative examples in addition to those described above are shown in Tables 6 to 10.

The evaluation on joining strength after the evaluation on heat resistance was performed on and confirmed in sample No. 11 (example 1 of the present disclosure), sample No. 17 (example 7 of the present disclosure) and sample No. 24 (example 14 of the present disclosure).

In view of these descriptions, it has been found that the concentration of the insert metal containing at least one selected from a group consisting of titanium, zirconium, and hafnium needs to be more than 0 atomic % and less than or equal to 5.0 atomic % at the location of 5 μm from joining interface 30 between first member 10 and second member 20 toward the second member 20 side. The concentration of the insert metal at this location is preferably more than or equal to 0.1 atomic % and less than or equal to 5.0 atomic %. The concentration of the insert metal at this location is preferably more than 0 atomic % and less than or equal to 1.0 atomic %. The concentration of the insert metal at this location is most preferably more than or equal to 0.1 atomic % and less than or equal to 1.0 atomic %.

The embodiments and examples disclosed herein are illustrative and non-restrictive in any respect. The scope of the present invention is defined by the terms of the claims, rather than the description above, and is intended to include any modifications within the scope and meaning equivalent to the terms of the claims.

REFERENCE SIGNS LIST

1: composite material; 10: first member; 20: second member; 30: interface; 110: jig; 120: indenter.

The invention claimed is:

1. A composite material comprising:
a first member containing tungsten as a primary component;
a second member containing copper as a primary component, the second member being joined to the first member; and
a metal containing at least one selected from a group consisting of titanium, zirconium, and hafnium, the metal being present in the second member, wherein
the first member and the second member being directly jointed to each other, a concentration of the metal is more than 0 atomic % and less than or equal to 5.0 atomic % at a location of 5 μm from a joining interface between the first member and the second member toward the second member side,
the atomic % is calculated by a spot analysis in which a spectrum of a characteristic X-ray when irradiated with an electron beam having an acceleration voltage of 15 kV, a beam current of 50 nA, and a spot diameter of 10 μm is divided to calculate a constituent ratio of elements in the metal using a ZAF method,
a joining strength of the composite material is 146 MPa and less than or equal to 239 MPa, and
a thickness of the second member is more than or equal to 10 mm.

2. The composite material according to claim 1, wherein the metal is titanium.

3. The composite material according to claim 1, wherein the concentration of the metal is more than or equal to 0.1 atomic % at the location of 5 μm from the joining interface between the first member and the second member toward the second member side, wherein the atomic % is calculated by the spot analysis in which the spectrum of the characteristic X-ray when irradiated with the electron beam having the acceleration voltage of 15 kV, the beam current of 50 nA, and the spot diameter of 10 μm is divided to calculate the constituent ratio of elements in the metal using the ZAF method.

4. The composite material according to claim 1, wherein the concentration of the metal is less than or equal to 1.0 atomic % at the location of 5 μm from the joining interface between the first member and the second member toward the second member side, wherein the atomic % is calculated by the spot analysis in which the spectrum of the characteristic X-ray when irradiated with the electron beam having the acceleration voltage of 15 kV, the beam current of 50 nA, and the spot diameter of 10 μm is divided to calculate the constituent ratio of elements in the metal using the ZAF method.

5. The composite material according to claim 1, wherein the second member includes a pure-copper-based layer provided on a side close to the first member, and a layer that has a strength higher than a strength of pure copper, that has a composition different from a composition of the pure-copper-based layer, and that is provided on a side far from the first member.

6. The composite material according to claim 5, wherein a thickness of the pure-copper-based layer is more than or equal to 0.2 mm and less than 1.5 mm.

7. The composite material according to claim 1, wherein the second member has:
a rod shape having a length, corresponding to the thickness, of more than or equal to 10 mm and less than or equal to 50 mm, or
a flat plate shape having the thickness equal to 15 mm.

8. The composite material according to claim 1, wherein the metal contains at least one of zirconium or hafnium.

* * * * *